(12) United States Patent
Mästle et al.

(10) Patent No.: US 12,061,077 B2
(45) Date of Patent: Aug. 13, 2024

(54) APPARATUS FOR DETERMINING A LAYER THICKNESS AND METHOD OF OPERATING SUCH APPARATUS

(71) Applicant: HELMUT FISCHER GMBH INSTITUT FÜR ELEKTRONIK UND MESSTECHNIK, Sindelfingen (DE)

(72) Inventors: Rüdiger Mästle, Böblingen (DE); Lars-Christian Anklamm, Berlin (DE)

(73) Assignee: Helmut Fischer GmbH Institut Fur Elektronik Und Messtechnik, Sindelfingen (DE)

( * ) Notice: Subject to any disclaimer, the term of this patent is extended or adjusted under 35 U.S.C. 154(b) by 268 days.

(21) Appl. No.: 17/599,863

(22) PCT Filed: May 8, 2020

(86) PCT No.: PCT/EP2020/062848
§ 371 (c)(1),
(2) Date: Sep. 29, 2021

(87) PCT Pub. No.: WO2020/239391
PCT Pub. Date: Dec. 3, 2020

(65) Prior Publication Data
US 2022/0205777 A1 Jun. 30, 2022

(30) Foreign Application Priority Data
May 24, 2019 (EP) .................................. 19176509

(51) Int. Cl.
*G01B 11/06* (2006.01)
*G01B 11/02* (2006.01)
(52) U.S. Cl.
CPC ........ *G01B 11/0625* (2013.01); *G01B 11/026* (2013.01)

(58) Field of Classification Search
CPC .............. G01B 11/0625; G01B 11/026; G01B 11/0616; G01N 21/8422; G01N 2021/8427; G01N 2021/8438; G01N 21/3586
See application file for complete search history.

(56) References Cited

U.S. PATENT DOCUMENTS

| | | | |
|---|---|---|---|
| 10,408,767 B1 * | 9/2019 | Pearcey | G01B 11/14 |
| 2010/0195090 A1 * | 8/2010 | Ohtake | G01B 11/0625 356/51 |

(Continued)

FOREIGN PATENT DOCUMENTS

WO 2019073074 A1 4/2019

OTHER PUBLICATIONS

Lee et al. "Terahertz Imaging with Quantum Cascade Lasers", Image Sensing Technologies: Materials, Devices, Systems, and Applications III, Proc. of SPIE vol. 9854, 98540R, 2016, p. 98540R-1-98540R-10 (Year: 2016).*

(Continued)

*Primary Examiner* — David P Porta
*Assistant Examiner* — Mamadou Faye
(74) *Attorney, Agent, or Firm* — Jessica W. Smith; LOZA & LOZA, LLP

(57) ABSTRACT

An apparatus determines a layer thickness of a plurality of layers arranged on a body. The apparatus includes a THz transmitter configured to emit a THz signal to said plurality of layers and a THz receiver configured to receive a reflected portion of said THz signal that has been reflected by at least one layer of said plurality of layers. The apparatus is configured to determine the layer thickness of at least one of said plurality of layers based on said reflected portion of said THz signal. The apparatus further includes a distance measuring device for determining at least one parameter char- (Continued)

acterizing a distance between said apparatus and said body, wherein said distance measuring device may include at least one optical triangulation sensor.

22 Claims, 8 Drawing Sheets

(56) References Cited

U.S. PATENT DOCUMENTS

| | | | |
|---|---|---|---|
| 2013/0003038 A1* | 1/2013 | Tachizaki | G01B 9/02008 356/5.11 |
| 2019/0259108 A1* | 8/2019 | Bongartz | G06Q 10/0639 |
| 2020/0240909 A1* | 7/2020 | Maas | G01N 33/32 |

OTHER PUBLICATIONS

PCT/EP2020/062848. Int'l Search Report & Written Opinion (Aug. 4, 2020).

EP Appln. No. 19176509.8. Extended Search Report (Nov. 19, 2019).

Micro-Epsilon: "Laser Triangulation Displacement Sensors" (Sep. 20, 2009). (cited in International Search Report PCT/EP2020/062848, Aug. 4, 2020). URL:https://web.archive.org/web/20090920091934if_/http://www.micro-epsilon.com:80/download/products/cat-optoNCDT-en.pdf.

* cited by examiner

APPARATUS FOR DETERMINING A LAYER THICKNESS AND METHOD OF OPERATING SUCH APPARATUS

CROSS REFERENCE TO RELATED APPLICATIONS

The present application claims priority as a national stage application under 35 U.S.C. § 371 to PCT Application No. PCT/EP2020/062848 filed on May 8, 2020, entitled, "Apparatus for Determining a Layer Thickness and Method of Operating such Apparatus," which claims priority to EP Application No. 19176509.8 filed on May 24, 2019, entitled "Apparatus for Determining a Layer Thickness and Method of Operating such Apparatus," both of which are incorporated by reference herein.

FIELD

The disclosure relates to an apparatus for determining a layer thickness of a plurality of layers arranged on a body using Terahertz (THz) radiation. The disclosure further relates to a method of operating an apparatus for determining a layer thickness of a plurality of layers arranged on a body using Terahertz, THz, radiation.

BACKGROUND

The German Patent Application No. DE102016118905 A1 filed on Oct. 5, 2016 and entitled, "Apparatus and method for time resolved detection of pulsed electromagnetic radio frequency radiation," discloses an apparatus for measuring THz radiation comprising a distance measurement system.

SUMMARY

Embodiments relate to an apparatus for determining a layer thickness of a plurality of layers arranged on a body, wherein said apparatus comprises a Terahertz, THz, transmitter configured to emit a THz signal to said plurality of layers and a THz receiver configured to receive a reflected portion of said THz signal that has been reflected by at least one layer of said plurality of layers, wherein said apparatus is configured to determine a layer thickness of at least one of said plurality of layers based on said reflected portion of said THz signal, wherein said apparatus further comprises a distance measuring device for determining at least one parameter characterizing a distance between said apparatus and said body, wherein said distance measuring device comprises at least one optical triangulation sensor. The optical triangulation sensor enables efficient and yet precise distance measurements and is also suitable for application in comparatively harsh environments such as industrial production lines.

According to further embodiments, said distance measuring device is configured to determine said distance between said apparatus and said body and/or variations of said distance between said apparatus and said body.

According to further embodiments, said distance measuring device is configured to determine said distance and/or said variations of said distance with a predetermined sample rate of at least 1 kilohertz (kHz), or at least 10 kHz, or at least 20 kHz.

According to further embodiments, said distance measuring device comprises two or more optical triangulation sensors.

According to further embodiments, said THz radiation comprises at least one frequency component in the range of 0.3 THz and 100 THz, preferably in the range of 0.5 THz and 10 THz.

According to further embodiments said at least one optical triangulation sensor comprises one light source for illuminating a surface region of said body with optical measurement radiation, wherein said optical measurement radiation particularly comprises laser radiation, and one light detector for receiving a respective reflected portion of said optical measurement radiation which has been reflected by said surface region.

According to further embodiments, said at least one optical triangulation sensor comprises one light source for illuminating a surface region of said body with optical measurement radiation, wherein said optical measurement radiation particularly comprises laser radiation, and at least two light detectors for receiving a respective reflected portion of said optical measurement radiation which has been reflected by said surface region.

According to further embodiments, said at least one optical triangulation sensor comprises a first light source for illuminating a surface region of said body with a first optical measurement radiation and a second light source for illuminating said surface region of said body with a second optical measurement radiation, wherein said first and/or second optical measurement radiation particularly comprises laser radiation, wherein said at least one optical triangulation sensor further comprises at least one light detector for receiving a reflected portion of said first and/or second optical measurement radiation which has been reflected by said surface region.

According to further embodiments said at least one optical triangulation sensor is arranged relative to an optical axis of said apparatus such that said at least one optical triangulation sensor can detect a) at least a diffuse reflection of optical measurement radiation emitted by at least one light source of said at least one optical triangulation sensor and reflected by a surface region of said body, preferably only a diffuse reflection of optical measurement radiation, and/or b) at least a direct reflection of optical measurement radiation emitted by at least one light source of said at least one optical triangulation sensor and reflected by a or said surface region of said body, preferably only a direct reflection of optical measurement radiation.

According to further embodiments, said at least one optical triangulation sensor is configured and arranged relative to an optical axis of said apparatus such that said at least one optical triangulation sensor can selectively detect a) a diffuse reflection of optical measurement radiation emitted by at least one light source of said at least one optical triangulation sensor and reflected by a surface region of said body, whereby a first triangulation path is defined, and/or b) a direct reflection of optical measurement radiation emitted by at least one light source of said at least one optical triangulation sensor and reflected by a or said surface region of said body, whereby a second triangulation path is defined.

According to further embodiments said apparatus is configured to determine a quality measure of said first triangulation path and said second triangulation path, and to select one of said first triangulation path and said second triangulation path depending on said quality measure, wherein said quality measure characterizes a variance and/or noise of a plurality of distance measurements associated with a respective one of said first triangulation path and said second triangulation path. According to further embodiments, said apparatus is configured to determine for said two triangulation paths a direction cosine relative to the surface normal. According to further embodiments, standard deviations of preferably synchronous measurements of said two triangulation paths over a limited time may be used as said signal quality measure.

According to further embodiments said apparatus comprises a laser source, a beam splitter, and an optical delay stage, wherein said THz transmitter comprises a THz source, wherein said THz receiver comprises a THz detector, wherein said laser source is configured to provide a laser signal to said beam splitter, wherein said beam splitter is configured to a) split said laser signal into a first signal and a second signal, b) provide said first signal to said THz source of said THz transmitter, c) provide said second signal to said optical delay stage, wherein said optical delay stage is configured to apply a predetermined time-variable, preferably periodical, delay to said second signal, wherein a delayed signal is obtained, and to provide said delayed signal to said THz detector of said THz receiver.

According to further embodiments, said apparatus is configured to determine a delay parameter, which characterizes an effective delay of said delayed signal taking into account the predetermined time-variable, preferably periodical, delay provided by said optical delay stage and variations of said distance between said apparatus and said body, wherein preferably said apparatus is configured to determine said layer thickness depending on said delay parameter. As an example, according to further embodiments, a time-dependent signal may be determined which characterizes a signal as received by means of said THz detector. Based on this time-dependent signal, the layer thickness of a plurality of layers arranged on a body may be determined. For compensating (undesired) distance variations during the respective THz measurement, the delay parameter may be used, e.g. for correcting and/or "refining" said time-dependent signal, thus eliminating the effect of the (undesired) distance variations. This way, more precise layer thickness measurements are enabled. In other words, according to further embodiments, the layer thickness is not determined directly depending on said delay parameter, but said delay parameter may be used to compensate errors in said time-dependent signal (and/or a time axis thereof), which increases a precision when determining said layer thickness depending on said (compensated) time-dependent signal.

Further embodiments relate to a method of operating an apparatus for determining a layer thickness of a plurality of layers arranged on a body, wherein said apparatus comprises a THz transmitter configured to emit a THz signal to said plurality of layers and a THz receiver configured to receive a reflected portion of said THz signal that has been reflected by at least one layer of said plurality of layers, wherein said apparatus is configured to determine a layer thickness of at least one of said plurality of layers based on said reflected portion of said THz signal, wherein said apparatus further comprises a distance measuring device for determining at least one parameter characterizing a distance between said apparatus and said body, wherein said distance measuring device comprises at least one optical triangulation sensor, wherein said method comprises: determining said at least one parameter characterizing the distance between said apparatus and said body, determining said layer thickness of said at least one of said plurality of layers depending on said at least one parameter.

According to further embodiments, said measuring device comprises two or more optical triangulation sensors, wherein preferably said two or more optical triangulation sensors are selectively and/or simultaneously used.

According to further embodiments, said at least one optical triangulation sensor comprises one light source for illuminating a surface region of said body with optical measurement radiation, wherein said optical measurement radiation particularly comprises laser radiation, and at least two light detectors for receiving a respective reflected portion of said optical measurement radiation which has been reflected by said surface region, wherein said method further comprises selecting one or more of said at least two light detectors for performing a distance measurement.

According to further embodiments, said at least one optical triangulation sensor comprises a first light source for illuminating a surface region of said body with a first optical measurement radiation and a second light source for illuminating said surface region of said body with a second optical measurement radiation, wherein said first and/or second optical measurement radiation particularly comprises laser radiation, wherein said at least one optical triangulation sensor further comprises at least one light detector for receiving a reflected portion of said first and/or second optical measurement radiation which has been reflected by said surface region, wherein said method further comprises selecting one or more of said at least two light sources for performing a distance measurement.

According to further embodiments, said at least one optical triangulation sensor is configured and arranged relative to an optical axis of said apparatus such that said at least one optical triangulation sensor can selectively detect a) a diffuse reflection of optical measurement radiation emitted by at least one light source of said at least one optical triangulation sensor and reflected by a surface region of said body, whereby a first triangulation path is defined, and/or b) a direct reflection of optical measurement radiation emitted by at least one light source of said at least one optical triangulation sensor and reflected by a or said surface region of said body, whereby a second triangulation path is defined, wherein said method further comprises selectively using the first triangulation path or the second triangulation path or both the first triangulation path and the second triangulation path, wherein preferably said apparatus determines a quality measure of said first triangulation path and said second triangulation path and selects one of said first triangulation path and said second triangulation path depending on said quality measure, wherein preferably said quality measure characterizes a variance and/or noise of a plurality of distance measurements associated with a respective one of said first triangulation path and said second triangulation path.

According to further embodiments, said apparatus comprises a laser source, a beam splitter, and an optical delay stage, wherein said THz transmitter comprises a THz source, wherein said THz receiver comprises a THz detector, wherein said laser source provides a laser signal to said beam splitter, wherein said beam splitter a) splits said laser signal into a first signal and a second signal, b) provides said first signal to said THz source of said THz transmitter, c) provides said second signal to said optical delay stage, wherein said optical delay stage applies a predetermined time-variable, preferably periodical, delay to said second signal, wherein a delayed signal is obtained, and provides said delayed signal to said THz detector of said THz receiver.

According to further embodiments, said apparatus determines a delay parameter, which characterizes an effective delay of said delayed signal taking into account the predetermined time-variable, preferably periodical, delay provided by said optical delay stage and variations of said distance between said apparatus and said body, wherein preferably said apparatus determines said layer thickness depending on said delay parameter.

Further embodiments relate to a use of the apparatus according to the embodiments and/or the method according to the embodiments for determining layer thicknesses of a plurality of layers arranged on a surface of a body, wherein preferably said body and/or said surface of said body is electrically conductive, wherein preferably a top layer of said plurality of layers comprises a clear coat, and wherein preferably a second layer, which is adjacent to said top layer, comprises a base coat. According to further embodiments, said surface of said body is not electrically conductive.

BRIEF DESCRIPTION OF THE DRAWINGS

Further features, aspects and advantages of the embodiments are given in the following detailed description with reference to the drawings in which.

DETAILED DESCRIPTION

Figure 1:
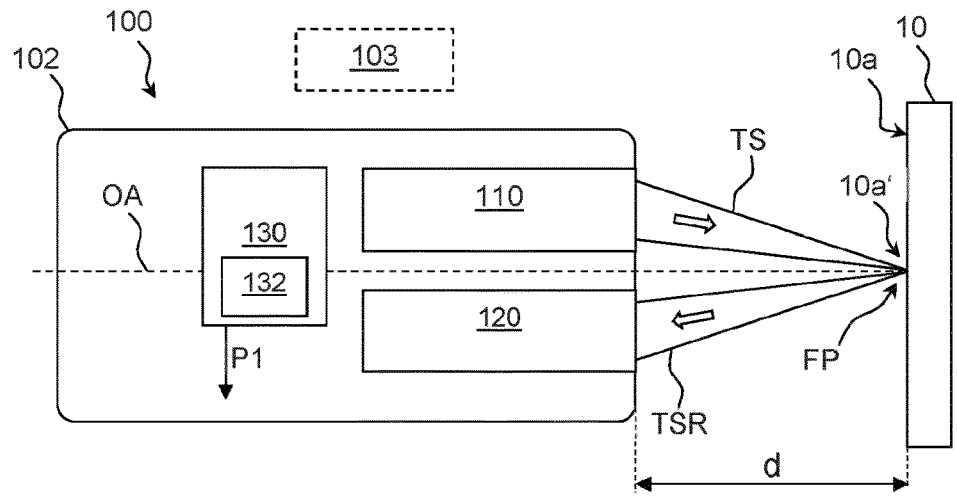
FIG. 1 schematically depicts a simplified block diagram of an apparatus according to embodiments.

FIG. 1 schematically depicts a simplified block diagram of an apparatus 100 according to preferred embodiments. The apparatus 100 is configured to determine a layer thickness of a plurality of layers arranged on a body, such as e.g. layers of a polymeric coating on a substrate, e.g. paint layers.

Figure 2:
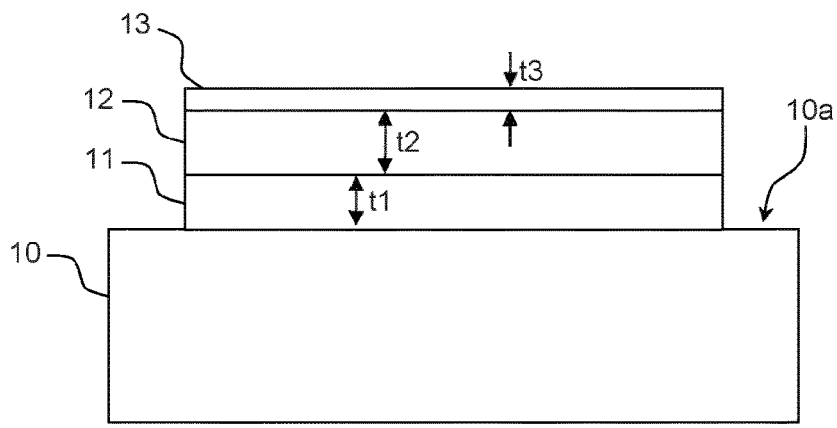
FIG. 2 schematically depicts a simplified side view of a plurality of layers arranged on a body according to further embodiments.

FIG. 2 schematically depicts a simplified side view of a plurality of layers 11, 12, 13 arranged on a body 10 according to further embodiments.

The apparatus 100 (FIG. 1) comprises a Terahertz, THz, transmitter 110 configured to emit a THz signal TS to said plurality of layers, which are e.g. arranged on a surface 10a of said body 10, and a THz receiver 120 configured to receive a reflected portion TSR of said THz signal TS that has been reflected by at least one layer 11, 12, 13 (FIG. 2) of said plurality of layers. Preferably, a focal point FP of the THz signal TS is directed to a surface region 10a' of the body comprising the optical axis OA of the apparatus 100. Preferably, the components 110, 120 are arranged in a common housing 102 forming a THz measurement head.

According to further embodiments, said THz radiation TS comprises at least one frequency component in the range of 0.3 THz and 100 THz, preferably in the range of 0.5 THz and 10 THz.

The apparatus 100 (FIG. 1) is configured to determine a layer thickness t1, t2, t3 (FIG. 2) of at least one of said plurality of layers 11, 12, 13 based on said reflected portion TSR of said THz signal TS, preferably by applying a time-domain reflectometry technique.

The apparatus 100 further comprises a distance measuring device 130 for determining at least one parameter P1 characterizing a distance d between said apparatus 100 and said body 10, wherein said distance measuring device 130 comprises at least one optical triangulation sensor 132. The optical triangulation sensor 132 enables efficient and yet precise distance measurements and is also suitable for application in comparatively harsh environments such as industrial production lines. Preferably, the distance measuring device 130 or at least one component of it is also arranged in and/or attached to said common housing 102.

According to further embodiments, a control device 103 may be provided to control an operation of the apparatus 100 or at least one component 110, 120, 130 thereof.

Figure 3:
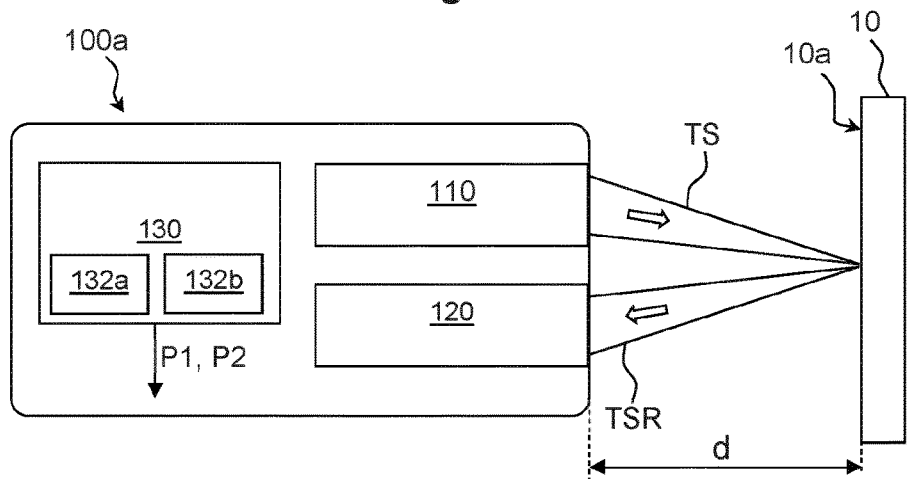
FIG. 3 schematically depicts a simplified block diagram of an apparatus according to further embodiments.

According to further embodiments, cf. the apparatus 100a of FIG. 3, said distance measuring device 130 comprises two or more optical triangulation sensors. Presently, two optical triangulation sensors 132a, 132b are exemplarily depicted by FIG. 3. The first triangulation sensor 132a is configured to determine a first parameter P1 characterizing said distance d between said apparatus 100a and said body 10, and the second triangulation sensor 132b is configured to determine a second parameter P2 characterizing said distance d between said apparatus 100a and said body 10. According to further embodiments, by comparing the parameters P1, P2, a proper operation of either of said sensors 132a, 132b may be validated. According to further embodiments the first parameter P1 and/or the second parameter P2 may correspond to said distance d, i.e. represent the distance d.

Figure 4A:
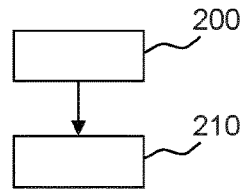
FIG. 4A schematically depicts a simplified flow-chart of a method according to further embodiments.

FIG. 4A schematically depicts a simplified flow-chart of a method according to further embodiments. In a first step 200, the apparatus 100, 100a, or its distance measuring device 130, respectively, determines said at least one parameter P1, P2 characterizing said distance d between said apparatus and said body 10. In a further step 210, the apparatus determines, preferably indirectly, said layer thickness t1, t2, t3 (FIG. 2) of said at least one of said plurality of layers 11, 12, 13 depending on said at least one parameter P1, P2. This way, a particularly precise layer thickness measurement may be performed. According to further embodiments, "indirectly determining said layer thickness t1, t2, t3 (FIG. 2) of said at least one of said plurality of layers 11, 12, 13 depending on said at least one parameter P1, P2" means that said at least one parameter P1, P2 is used for a process of determining said layer thickness t1, t2, t3, wherein, however, said layer thickness t1, t2, t3 is not directly derived from said at least one parameter P1, P2. As an example, according to further embodiments, a time-dependent signal may be determined which characterizes a signal as received by means of said THz receiver 120. Based on this time-dependent signal, the layer thickness t1, t2, t3 of a plurality of layers 11, 12, 13 arranged on said body 10 may be determined. For compensating (undesired) distance variations during the respective THz measurement, a delay parameter C8 as explained further below with reference e.g. to FIG. 9H may be used, e.g. for correcting and/or "refining"

said time-dependent signal, thus eliminating the effect of the (undesired) distance variations, wherein said delay parameter C8 may be determined depending on said at least one parameter P1, P2. This way, more precise layer thickness measurements are enabled. In other words, according to further embodiments, the layer thickness t1, t2, t3 is not determined directly depending on said delay parameter C8, but said delay parameter may be used to compensate errors in said time-dependent signal (and/or a time axis thereof), which increases a precision when determining said layer thickness depending on said (compensated) time-dependent signal.

Figure 5A:
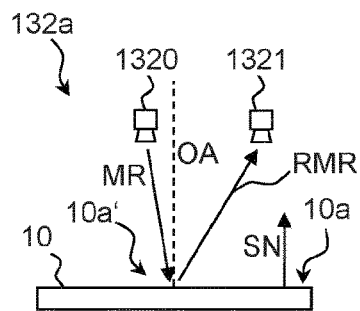
FIG. 5A schematically depicts a simplified side view of a sensor according to further embodiments.

According to further embodiments, cf. FIG. 5A, said at least one optical triangulation sensor 132a comprises one light source 1320 for illuminating a surface 10a' region of a surface 10a of said body 10 with optical measurement radiation MR, wherein said optical measurement radiation MR particularly comprises laser radiation, and one light detector 1321 for receiving a respective reflected portion RMR of said optical measurement radiation MR which has been reflected by said surface region 10a'. Reference sign SN indicates a surface normal SN of the surface 10a of the body 10. Exemplarily, the arrow MR characterizes an optical axis of the light source 1320.

According to further embodiments, the optical triangulation sensor 132a is configured to determine the distance d (FIG. 1) to the body 10 (also cf. FIG. 5A) by evaluating said reflected portion RMR of said measurement radiation MR in a manner per se known in the field of optical triangulation sensors. According to further embodiments, this may also apply to the further configurations 132b, 132c, 132d of optical triangulation sensors according to further embodiments, which are exemplarily explained below with reference to FIG. 5B, 6, 7.

According to further embodiments, said at least one optical triangulation sensor 132a is arranged relative to an optical axis OA (FIG. 1, 5A) of said apparatus such that said at least one optical triangulation sensor 132a can detect at least a diffuse reflection of optical measurement radiation MR emitted by said at least one light source 1320 of said at least one optical triangulation sensor 132a and reflected by a surface region 10a' of said body 10, preferably only (or, at least to a certain extent) a diffuse reflection of said optical measurement radiation MR. This can e.g. be attained by the spatial and/or angular arrangement of the components 100, 1320, 1321 relative to each other as exemplarily depicted by FIG. 5A.

Figure 5B:
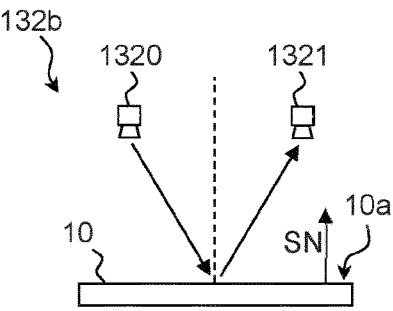
FIG. 5B schematically depicts a simplified side view of a sensor according to further embodiments.

According to further embodiments, cf. FIG. 5B, said at least one optical triangulation sensor 132b is arranged relative to an optical axis OA (FIG. 1) of said apparatus such that said at least one optical triangulation sensor 132b can detect at least a direct reflection of optical measurement radiation MR (FIG. 5A) emitted by said at least one light source 1320 (FIG. 5B) of said at least one optical triangulation sensor 132b and reflected by said surface region 10a' of said body 10, preferably only a direct reflection of optical measurement radiation. This can e.g. be attained by the spatial and/or angular arrangement of the components 100, 1320, 1321 relative to each other as exemplarily depicted by FIG. 5B, e.g. an angularly symmetrical arrangement of components 1320, 1321 with respect to the optical axis OA and/or the surface normal SN of the body 10.

Figure 6:
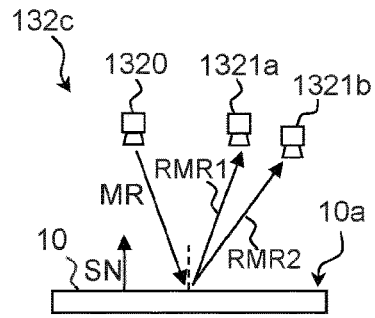
FIG. 6 schematically depicts a simplified side view of a sensor according to further embodiments.

According to further embodiments, cf. FIG. 6, said at least one optical triangulation sensor 132c comprises one light source 1320 for illuminating a surface region 10a' of said body 10 with optical measurement radiation MR, wherein said optical measurement radiation MR particularly comprises laser radiation, and at least two light detectors 1321a, 1321b for receiving a respective reflected portion RMR1, RMR2 of said optical measurement radiation MR which has been reflected by said surface region 10a'. According to further embodiments, using this configuration 132c of FIG. 6, it is possible to selectively use either (primarily) diffuse reflections or (primarily) direct reflections for determining said parameter P1, P2, or both, by selecting a corresponding one of said light detectors 1321a, 1321b for analyzing the reflected measurement radiation RMR1, RMR2. According to further embodiments, the light detectors 1321a, 1321b are arranged at different angular positions with respect to the optical axis OA (also cf. FIG. 5A). According to further embodiments, the first light detector 1321a may be arranged symmetrically with respect to the light source 1320 and the optical axis OA, whereas the second light detector 1321b may not be arranged symmetrically with respect to the light source 1320 and the optical axis OA.

Figure 7:
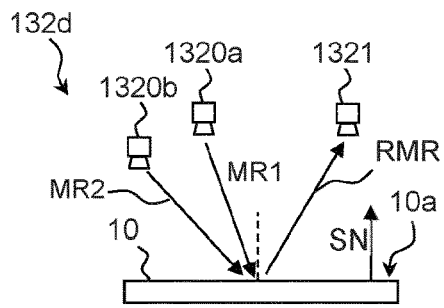
FIG. 7 schematically depicts a simplified side view of a sensor according to further embodiments.

According to further embodiments, cf. FIG. 7, said at least one optical triangulation sensor 132d comprises a first light source 1320a for illuminating a surface region 10a' of said body 10 with a first optical measurement radiation MR1 and a second light source 1320b for illuminating said surface region 10a' of said body 10 with a second optical measurement radiation MR2, wherein said first and/or second optical measurement radiation MR1, MR2 particularly comprises laser radiation, wherein said at least one optical triangulation sensor 132d further comprises at least one light detector 1321 for receiving a reflected portion RMR of said first and/or second optical measurement radiation MR1, MR2 which has been reflected by said surface region 10a'. According to further embodiments, the light sources 1320a, 1320b are arranged at different angular positions with respect to the optical axis OA (also cf. FIG. 5A). According to further embodiments, the first light source 1320a may be arranged symmetrically with respect to the light detector 1321 and the optical axis OA, whereas the second light source 1320b may not be arranged symmetrically with respect to the light detector 1321 and the optical axis OA.

According to further embodiments, said at least one optical triangulation sensor 132c, 132d is configured and arranged relative to an optical axis OA of said apparatus 100, 100a such that said at least one optical triangulation sensor 132c, 132d can selectively detect a) a diffuse reflection of optical measurement radiation MR emitted by at least one light source 1320, 1320a, 1320b of said at least one optical triangulation sensor and reflected by a surface region 10a' of said body 10, whereby a first triangulation path is defined, and/or b) a direct reflection of optical measurement radiation emitted by at least one light source 1320, 1320a, 1320b of said at least one optical triangulation sensor and reflected by said surface region 10a' of said body 10, whereby a second triangulation path is defined. Particularly the exemplary configurations of FIG. 6, 7 enable to selectively use direct reflections and/or diffuse reflections of measurement radiations at said surface 10a of said object.

As an example, for illustrative purposes, the first triangulation path ((at least primarily) diffuse reflection case) may be considered to comprise e.g. arrows MR, RMR2 of FIG. 6, and the second triangulation path ((at least primarily) direct reflection case) may be considered to comprise e.g. arrows MR, RMR1 of FIG. 6. As a further example, for illustrative purposes, the first triangulation path ((at least primarily) diffuse reflection case) may be considered to comprise e.g. arrows MR2, RMR of FIG. 7, and the second triangulation path ((at least primarily) direct reflection case) may be considered to comprise e.g. arrows MR1, RMR of FIG. 7.

According to further embodiments, a diffuse reflection may be obtained if the surface normal SN of the surface 10a to be measured is not within a triangulation plane defined by e.g. the arrows MR, RMR (FIG. 5A) and/or the arrows between elements 1320, 1321 of FIG. 6. Whether a diffuse reflection and/or direct reflection of said measurement radiation MR is used may—according to further embodiments—e.g. be determined by an angular arrangement of the optical axis OA of the elements of said optical triangulation sensor(s) with respect to the surface normal SN.

According to further embodiments, at least one of said light sources and/or light detectors of at least one optical triangulation sensor (and/or at least one component thereof) may be movable, particularly rotatable, preferably around the focal point FP of the THz radiation on the surface 10a, to control diffuse and/or direct reflections for measurement.

According to further embodiments, a diffuse reflection of measurement radiation MR may be obtained if the surface normal SN of the surface 10a to be measured is within the triangulation plane defined by e.g. the arrows MR, RMR (FIG. 5A), and if arrows MR, RMR do not include a respective angle of same value with the surface normal SN, as depicted by FIG. 5A.

According to further embodiments, a diffuse reflection of measurement radiation MR may be obtained if the surface normal SN of the surface 10a to be measured is not within the triangulation plane defined by e.g. the arrows MR, RMR (FIG. 5A), independent of which angles are defined between a respective arrow MR, RMR and the surface normal SN.

According to further embodiments, whether or not the surface normal SN of the surface 10a to be measured is within a triangulation plane may be controlled by positioning the measuring head 102 relative to the surface normal SN and hence the body 10.

According to further embodiments, a symmetric arrangement of the optical axes of elements 1320, 1321 with respect to the optical axis OA of the measuring head 102 (e.g., same angles between respective optical axis of elements 1320, 1321 and the optical axis OA) may e.g. be attained by design, e.g. by symmetrically arranging elements 1320, 1321 with respect to the measuring head 102 or its (other) components 110, 120. Similarly, according to further embodiments, an asymmetric arrangement may be attained, e.g. by asymmetrically arranging elements 1320, 1321 (and/or other elements) with respect to the measuring head 102 or its (other) components 110, 120.

According to further embodiments, a diffuse reflection of measurement radiation MR, MR1, MR2 is used for matte surfaces 10a to slightly scattering surfaces 10a.

According to further embodiments, a direct reflection of measurement radiation MR may be obtained if the surface normal SN of the surface 10a to be measured is within the triangulation plane defined by e.g. the arrows MR, RMR (FIG. 5A), and if arrows MR, RMR do include a respective angle of same absolute value with the surface normal SN, as depicted by FIG. 5B.

According to further embodiments, a direct reflection of measurement radiation MR, MR1, MR2 is used for glossy surfaces 10a to slightly scattering surfaces 10a.

According to further embodiments, more than two light sources per sensor and/or more than two detectors per sensor are also possible, wherein further degrees of freedom for distance measurement may be provided. This way, a reliable and precise distance measurement is enabled according to further embodiments, which is substantially independent e.g. of surface properties of the layers 11, 12, 13 such as glossy and/or matte surfaces and the like.

According to further embodiments, one or more light sources per sensor and/or more than two detectors per sensor may be provided, and/or more than one light source and at least one detector. Said light source(s) and detectors(s) may be positioned and arranged such relative to each other that a plurality of triangulation paths is defined, wherein at least one triangulation path enables to perform a distance measurement based on evaluation of a direct reflection of measurement radiation, and wherein at least one further triangulation path enables to perform a distance measurement based on evaluation of a diffuse reflection of measurement radiation. According to further embodiments, at least one of said triangulation paths may be dynamically (i.e., during operation of said apparatus) selected for one or more distance measurements.

Figure 4B:
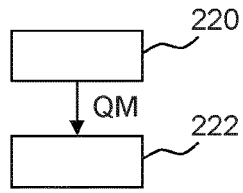
FIG. 4B schematically depicts a simplified flow-chart of a method according to further embodiments.

According to further embodiments, cf. the flow chart of FIG. 4B, said apparatus is configured to determine 220 a quality measure QM of said first triangulation path MR, RMR2 (FIG. 6) and said second triangulation path MR, RMR1, and to select 222 (FIG. 4B) one of said first triangulation path and said second triangulation path depending on said quality measure QM, wherein said quality measure QM e.g. characterizes a variance and/or noise of a plurality of distance measurements associated with a respective one of said first triangulation path and said second triangulation path. This way, those of said triangulation paths may be determined and/or selected for (future) distance measurements which are considered to yield more accurate distance measurement values, based on said quality measure QM. This e.g. enables to choose an appropriate triangulation path for glossy surfaces 10a, and a (different) appropriate triangulation path e.g. for matte surfaces 10a.

According to further embodiments, the steps 220, 222 according to FIG. 4B may e.g. (at least optionally) be performed prior to a THz-signal based layer thickness measurement, e.g. preceding to steps 200, 210 according to FIG. 4A.

Figure 8:
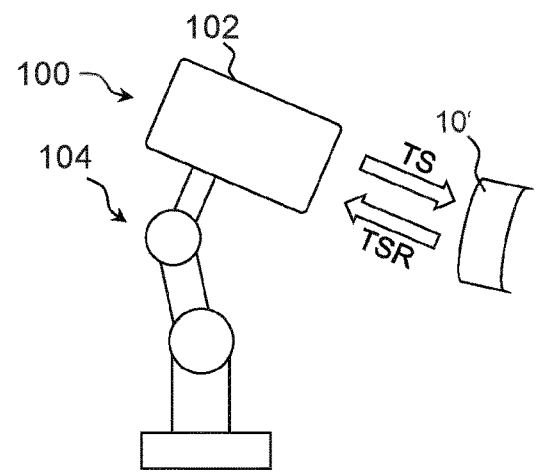
FIG. 8 schematically depicts a configuration according to further embodiments.

FIG. 8 schematically depicts a configuration according to further embodiments. The apparatus 100 is mounted on a positioning system 104 such as a robot, which enables to flexibly place the measuring head 102 in a desired position and/or angular position for precise layer thickness measurements with respect to the object 10'.

According to further embodiments, at least one layer thickness of at least one layer arranged on said object 10' may be measured at a plurality of measuring points of a surface 10a (FIG. 1) of said object 10' (FIG. 8). According to further embodiments, the robot 104 may correspondingly position the measuring head 102 at the various measuring points, i.e. one measuring point after the other. According to further embodiments, after each positioning step (or at least after one or more of said positioning steps), e.g. if a new measuring point has been set, the steps 220, 222 of FIG. 4B may be performed to determine said quality measure QM for the respective measuring point, and to select 222 (FIG. 4B) a corresponding triangulation path to be used for distance measurement (step 200 of FIG. 4A) at said respective measuring point. This way, the precision regarding distance measurement at a respective measuring point may be further increased, thus also increasing the precision of layer thickness measurements at said respective measuring point.

Figure 10:
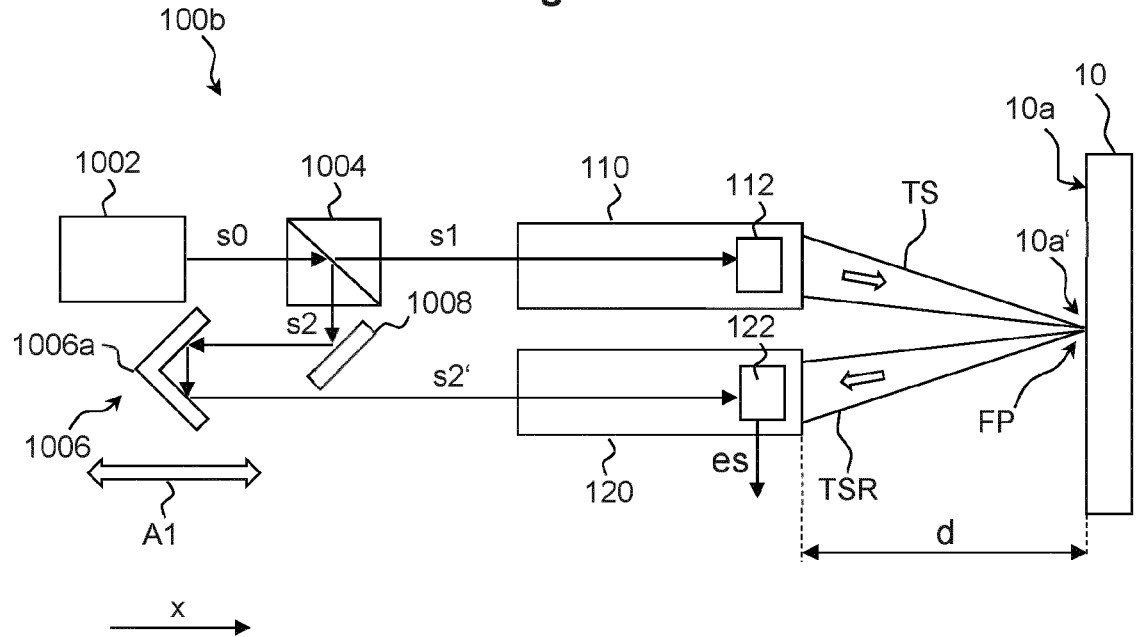
FIG. 10 schematically depicts a simplified block diagram of an apparatus according to further embodiments.

According to further embodiments, cf. FIG. 10, said apparatus 100b comprises a laser source 1002, a beam splitter 1004, and an optical delay stage 1006, wherein said THz transmitter 110 comprises a THz source 112, wherein said THz receiver 120 comprises a THz detector 122, wherein said laser source 1002 is configured to provide a laser signal s0 to said beam splitter 1004, wherein said beam splitter 1004 is configured to a) split said laser signal s0 into a first signal s1 and a second signal s2, b) provide said first signal s1 to said THz source 112 of said THz transmitter 110, c) provide said second signal s2, optionally via an optional mirror 1008, to said optical delay stage 1006, wherein said optical delay stage 1006 is configured to apply a predetermined time-variable, preferably periodical, delay to said second signal s2, wherein a delayed signal s2' is obtained, and to provide said delayed signal s2' to said THz detector 122 of said THz receiver 120.

According to further embodiments, one or more of the components 1002, 1004, 1006, 1006a, 1008, 112, 122 may also be provided in the THz measuring head 102 according to FIG. 1.

According to further embodiments, said THz source 112 may comprise a photoconductive switch (not shown) which may generate said THz signal TS in response to receiving said first signal s1 from the laser source 1002. A direct current (DC) bias voltage may be provided to said photoconductive switch but is not depicted in FIG. 10, either, for the sake of clarity. Preferably, said laser signal s0 comprises comparatively short laser pulses with a duration (for example full width at half maximum, FWHM) e.g. in the femtosecond range. This way, THz pulses may be provided in a per se known manner which form said THz signal TS.

According to further embodiments, said THz detector 122 may be configured to receive said reflected portion TSR of said THz signal TS and to generate an electric output signal es characterizing said reflected portion TSR when receiving the delayed signal s2', preferably in the form of a plurality of comparatively short (in comparison with a duration of said received reflected portion TSR of said THz signal TS) laser pulses. This way, the delayed laser signal s2' "probes" the reflected portion TSR of said THz signal TS as received by the detector 122.

According to further embodiments, said THz detector 122 may also comprise a photoconductive switch (e.g., similar to the photoconductive switch of the THz source 112), in which free charge carriers are generated when said reflected portion TSR of said THz signal TS is received by the detector and when said detector 122 is (simultaneously) illuminated with said delayed signal s2'. By applying a DC bias voltage to said detector 122, an electric current, resulting from said generated free charge carriers, may be obtained at the detector 122, which may e.g. form the electric output signal es. Alternatively, according to further embodiments, an electric voltage characterizing said electric current, may be used as said output signal es. According to further embodiments, an amplifier (not shown) may be used to provide an output voltage es characterizing said current provided by the photoconductive switch of the detector 122.

In other words, said electric output signal es is proportional to an instantaneous electric field of the received reflected portion TSR of said THz signal TS. This way, by irradiating the photoconductive switch of the detector 122 with a plurality of comparatively short (in comparison with a duration of said received reflected portion TSR of said THz signal TS) laser pulses in form of said delayed signal s2', the received reflected portion TSR may be sampled or probed, respectively. By varying the delay of said delayed signal s2', e.g. by controlling the optical delay stage 1006, for different impulses of said delayed signal s2', different portions of the received reflected portion TSR of said THz signal TS may be sampled, whereby a time-resolved sampled signal characterizing said received reflected portion TSR is obtained.

According to further embodiments, the electric output signal es is sampled with a first sample rate of e.g. 200 kilohertz (kHz), whereby a sampled signal is obtained which is a time-discrete and value discrete representation of said reflected portion TSR of said THz signal TS as received by the detector 122, e.g. of the electric field associated with said reflected portion TSR of said THz signal TS as received by the detector 122.

Figure 9A:
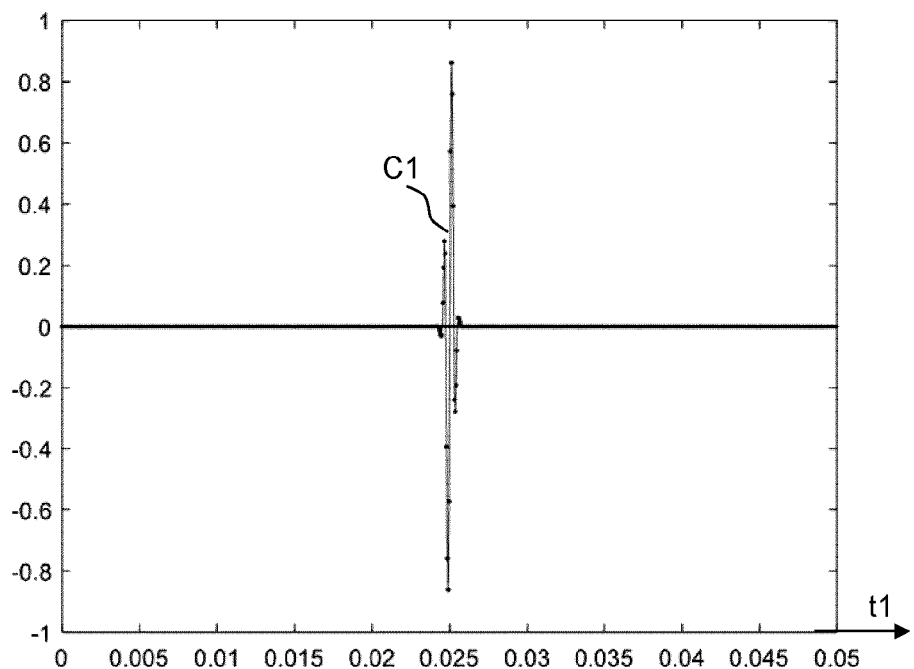
FIG. 9A to FIG. 9J each schematically depicts operational parameters according to further embodiments.

In this regard, curve C1 of FIG. 9A exemplarily depicts an electric field amplitude [in arbitrary unit] of said reflected portion TSR of said THz signal TS over a first time axis t1, which may e.g. correspond to real time. Curve C1 e.g. corresponds with said sampled signal es and may correspond with an operational scenario where no (or negligible) vibrations are present, which—according to further embodiments—may influence the distance d (FIG. 1) between the elements 102, 110, 120, 130 and the body 10.

According to further embodiments, the sampling and/or further processing of said sampled signal, cf. e.g. curve C1 of FIG. 9A, may e.g. be performed by the control device 103 of FIG. 1 and/or by an external device (not shown).

According to further embodiments, the layer thickness measurements of the layers 11, 12, 13 (FIG. 2) may be performed based on said sampled signal C1 (FIG. 9A) derived from the electric output signal es. As an example, a mathematical model of said layers 11, 12, 13 on said body 10 may be provided which enables to determine the layer thickness t1, t2, t3 of one or more of said layers based on said reflected portion TSR of said THz signal TS and/or said electric output signal es, e.g. curve C1.

According to further embodiments, said optical delay stage 1006, cf. FIG. 10, may comprise a corner reflector 1006a which is e.g. translationally movable, cf. block arrow A1 of FIG. 10, along a coordinate axis x. This configuration may also be referred to as "shaker" 1006.

By periodically moving said corner reflector 1006a along the coordinate axis x, said predetermined time-variable, preferably periodical, delay may be applied to said second signal s2, which enables to sample the received reflected portion TSR of said THz signal TS in a time-resolved manner, as mentioned above.

According to further embodiments, a position and/or movement of said corner reflector 1006a may be controlled by said control device 103. Preferably, according to further embodiments, said position and/or movement of said corner reflector 1006a may be synchronized with a generation of pulses of said THz signal TS and/or with the operation of the laser source 1002.

According to further embodiments, said corner reflector 1006a is periodically moved between two end points (not shown) along said coordinate axis x. For this purpose, a translation stage (not shown) and/or any other suitable (e.g., linear) drive for driving said movement of said corner reflector 1006a may be provided. Said drive may e.g. be controlled by the control device 103.

Figure 9B:
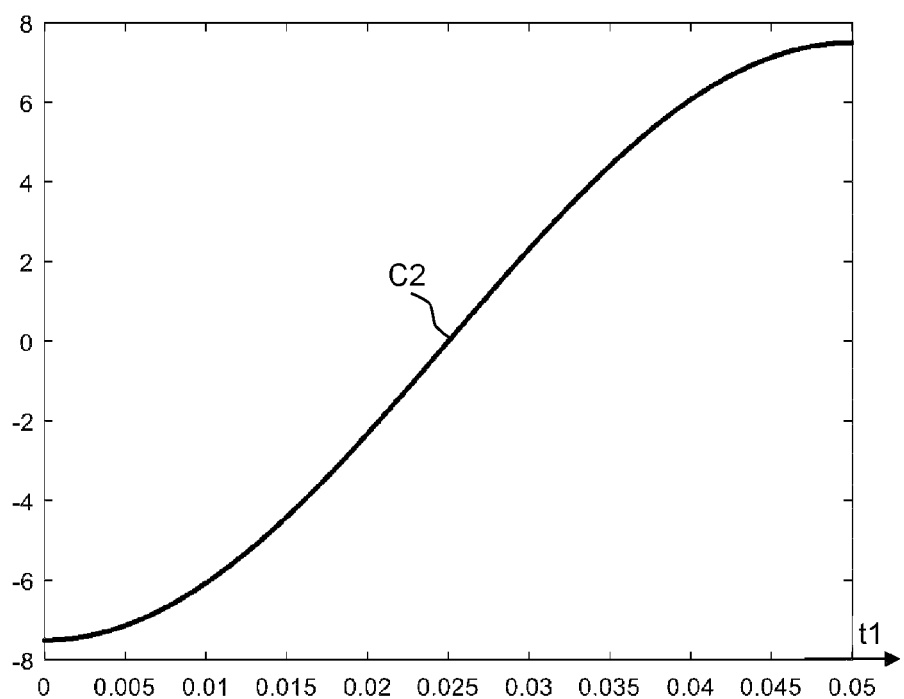

In FIG. 9B, curve C2 exemplarily depicts an elongation of said corner reflector 1006a over time t1, wherein the same time axis t1 characterizing real time as depicted by FIG. 9A is used. It can be seen that said elongation C2 exemplarily comprises a basically sinusoidal shape. According to further embodiments, information on said elongation C2 over time t1 may be determined by the control device 103 depending on a control signal as e.g. provided by the control device 103 for the drive of said corner reflector 1006a. Alternatively or additionally, according to further embodiments, said elongation C2 over time t1 may also be measured.

Figure 9C:
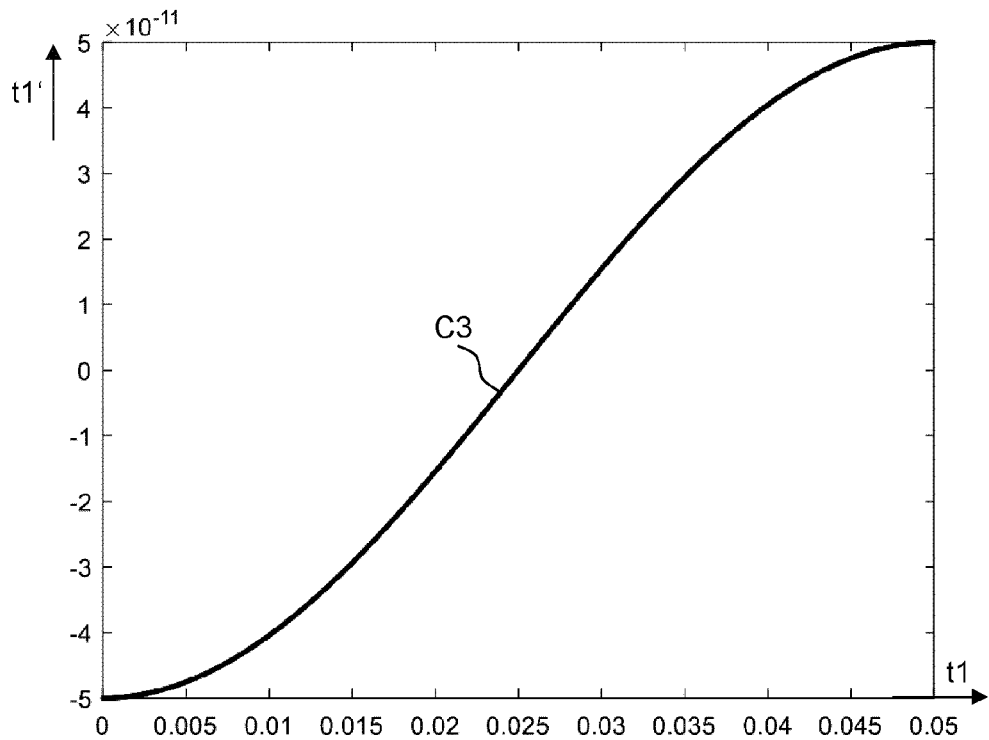

According to further embodiments, a THz time base t1', cf. curve C3 of FIG. 9C, may be determined based on curve C2 of FIG. 9B. In other words, curve C3 maps the real time axis t1, for which said sampled signal C1 (FIG. 9A) has been obtained, to a further time axis t1' associated with the received reflected THz pulse TSR. Note the different scaling ranging from t1=0 s to t1=0.05 s for the real time axis t1 and ranging from $-5 \times 10-11$ s to $-5 \times 10-11$ s for the THz time base t1'.

Figure 9D:
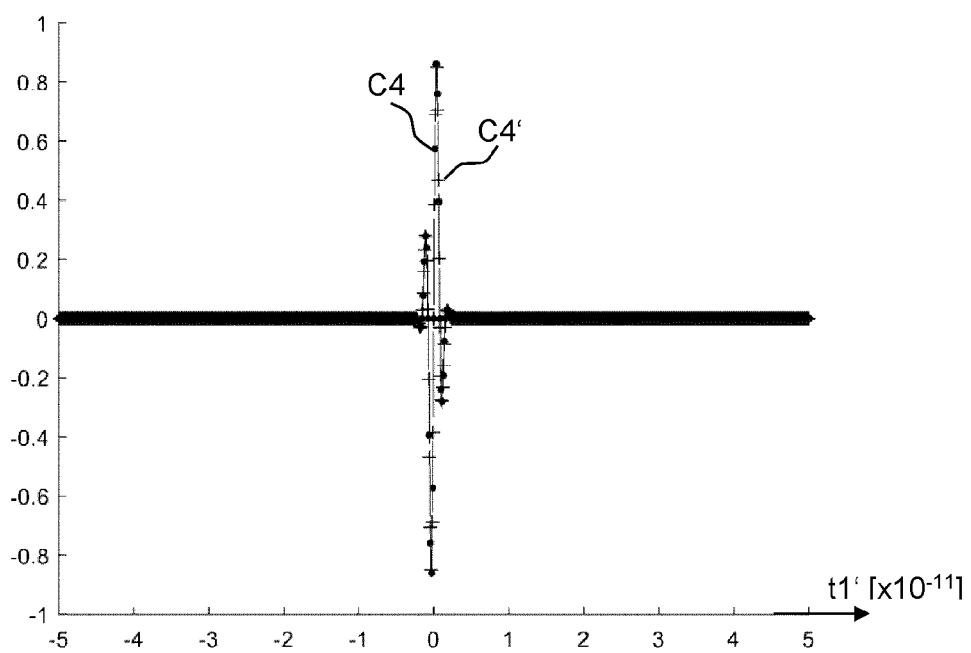

According to further embodiments, said THz time base t1' may be used to map the sampled signal C1 (FIG. 9A) to the THz time base t1', cf. curve C4 of FIG. 9D, which represents the electric field [in arbitrary unit] of said received reflected THz pulse TSR over the THz time base t1'. According to further embodiments, an equidistant interpolation of curve C4 may be applied, which yields curve C4'.

According to further embodiments, the signal represented by curve C4' may be employed to determine the layer thickness of one or more of said layers 11, 12, 13 on said body 10.

The embodiments explained above with reference to FIG. 9A to FIG. 9D are based on the assumption that no or at least no substantial vibrations are present in the time interval in which said THz signal TS is emitted towards the body 10 and in which said reflected portion TSR of said THz signal TS is received by the detector 122.

If, however, according to further embodiments, vibrations are present, which is expected for a real application of e.g. the measuring head 102 mounted to a positioning system 104 (FIG. 8), this may affect precision of layer thickness measurement as said vibrations usually cause undesired variations of the distance d (FIG. 1) between the devices 110, 120, 130 and the body 10.

To address potential vibrations, according to further embodiments, the apparatus 100, 100a, 100b is configured to determine a delay parameter, which characterizes an effective delay of said delayed signal s2' (FIG. 10) taking into account the predetermined time-variable, preferably periodical, delay provided by said optical delay stage 1006 and variations of said distance d between said apparatus 100 and said body 10 (as e.g. caused by the mentioned vibrations), wherein preferably said apparatus is configured to determine said layer thickness depending on said delay parameter.

In other words, according to further embodiments, a variation in time of said distance d between the devices 110, 120, 130 and the body 10 is taken into consideration when determining said layer thicknesses. Advantageously, said variation in time of said distance d may be considered in the form of said delay parameter, which enables a combined processing of two effects that may influence a precision of layer thickness measurement: a) the delay as introduced by optical delay stage 1006, which is desired as it enables to attain a sampled, i.e. time-resolved signal shape of the electrical field of a reflected portion TSR of a THz signal or pulse TS, and b) the delay as introduced by vibrations, which is usually undesired as it affects precision.

According to further embodiments, the apparatus 100 performs distance measurements, e.g. by using said distance measuring device 130, wherein preferably distance measurements are performed with a rate of 1 kHz (kilohertz) or greater, preferably 10 kHz or greater, e.g. 20 kHz. Further preferably, said distance measurements are synchronized with an emission of said THz signal TS and/or a reception of said reflected portion TSR. This way, variations in distance between the devices 110, 120, 130 and the body 10 may be determined and may be taken into consideration for layer thickness measurement. According to further embodiments, and as already mentioned above, prior to performing said distance measurements, said apparatus may first determine a suitable triangulation path for said distance measurements, e.g. depending on the quality measure QM as explained above with reference to FIG. 4B.

Figure 9E:
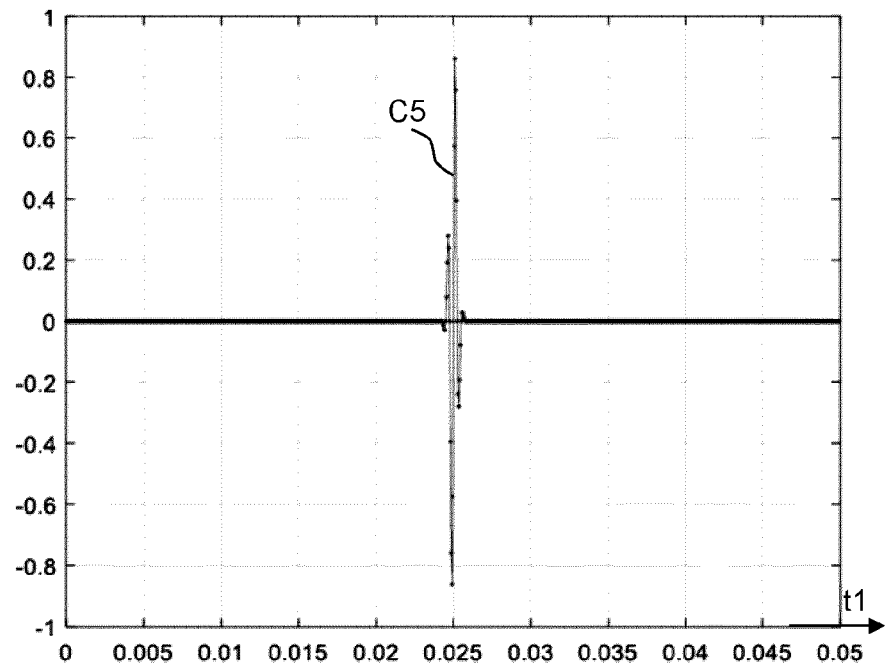

As an example, curve C5 of FIG. 9E exemplarily depicts an electric field amplitude [in arbitrary unit] of said reflected portion TSR of said THz signal TS over said first time axis t1, which may e.g. correspond to real time, wherein an exemplary time range of 0.05 seconds is depicted, similar to curve C1 of FIG. 9A. In contrast to FIG. 9A, however, curve C5 of FIG. 9E corresponds with an operational scenario where nonvanishing vibrations are present, leading to undesired variations of said distanced (FIG. 1) during THz measurements.

Figure 9F:
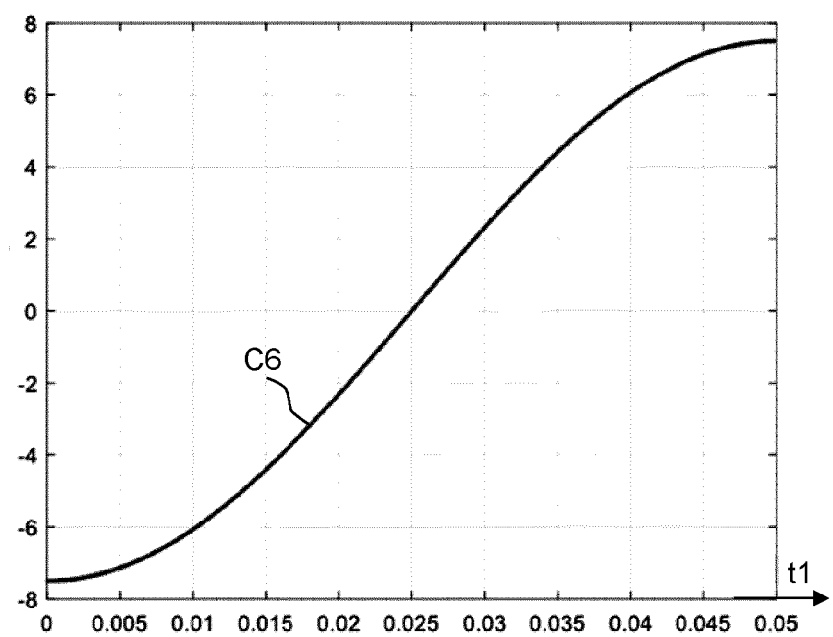

In FIG. 9F, similar to curve C2 of FIG. 9B, curve C6 exemplarily depicts an elongation of said corner reflector 1006a over time t1, i.e. the same time axis characterizing real time as depicted by FIG. 9E. According to further embodiments, said elongation C6 of said corner reflector 1006a over time t1 may be determined from a (known) control signal for a drive used to drive said motion of said corner reflector 1006a and/or by measurement, as mentioned above.

Figure 9G:
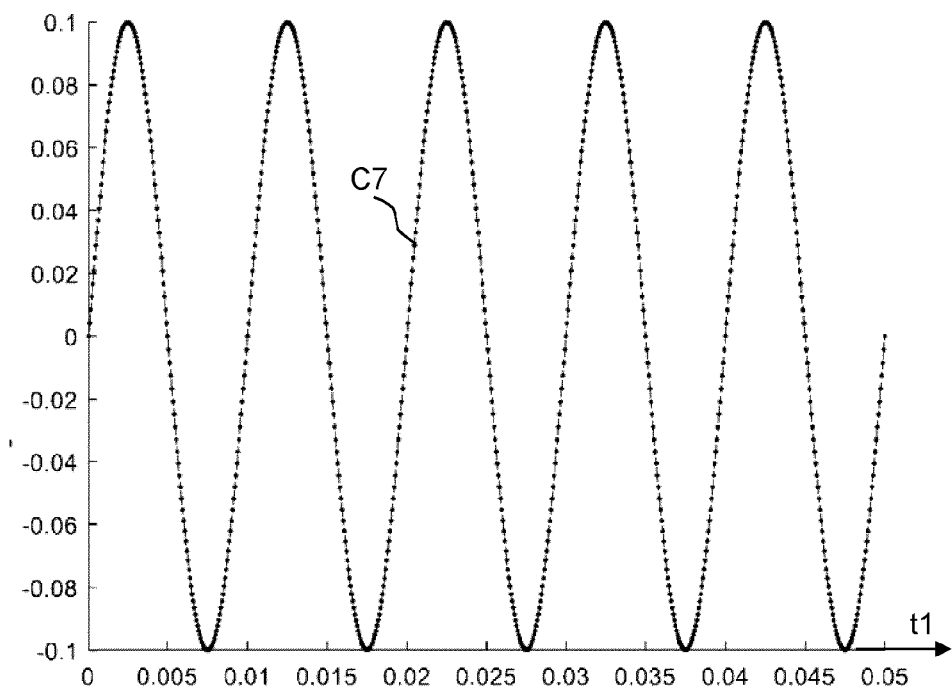

FIG. 9G schematically depicts a variation over time t1 of the distanced (FIG. 1), presently exemplary in the form of a sinusoidal oscillation, cf. curve C7, measured in millimeters. Note that curve C7 of FIG. 9G does not depict the absolute distance d, but rather an undesired time-varying portion thereof which is e.g. caused by said vibrations. It can be seen from FIG. 9G that due to said vibrations, the absolute distance varies by about 0.2 millimeters (mm) over time, which may cause a significant error for the THz-signal based layer thickness measurements, as these THz-signal based layer thickness measurements at least indirectly depend from said distance d due to signal propagation effects via a measurement path including the THz transmitter 110, the transmission path from said THz transmitter 110 to said body 10, and the transmission path from said body 10 to the THz receiver 120.

According to further embodiments, said variations C7 may be derived from measurements of said (absolute) distanced (FIG. 1) at a predetermined rate, e.g. 20 kHz, e.g. by subtracting a mean value of said absolute distance measurements from said measurements of said distance d. Advantageously, said distance measurements may be performed by means of said distance measuring device 130 (FIG. 1).

According to further embodiments, a correction of an associated time axis may be performed depending on the first parameter P1 and/or the second parameter P2, wherein either the first parameter P1 or the second parameter P2 may be chosen, i.e. depending on the respective quality measure QM of the associated triangulation path.

Figure 9H:
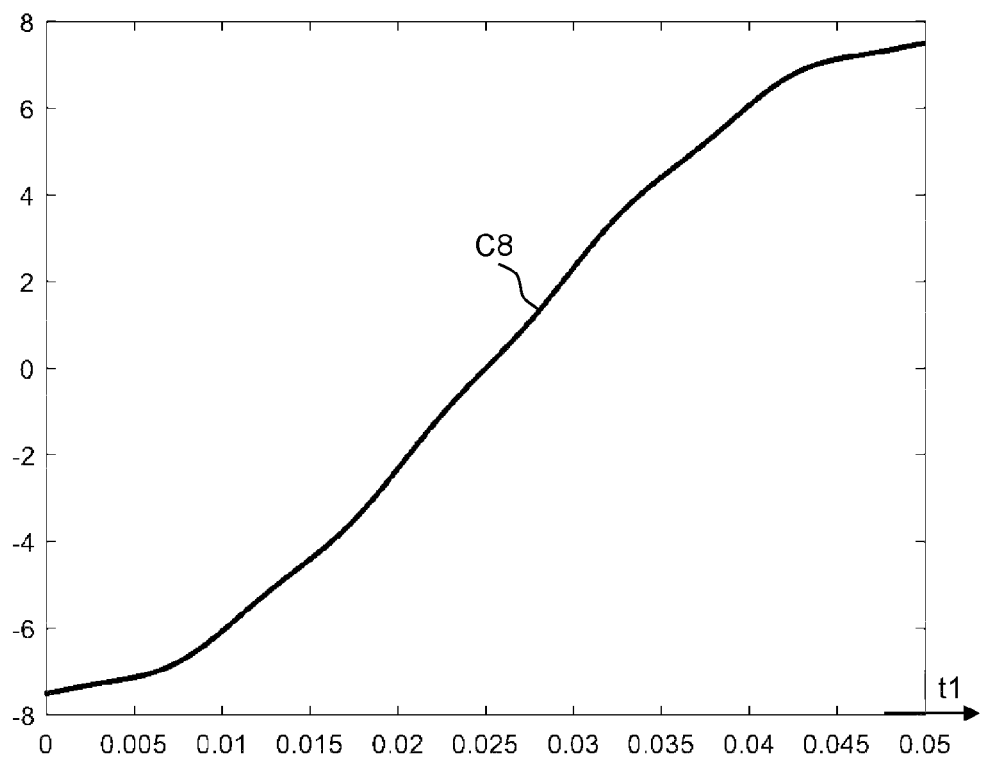

According to further embodiments, an effective elongation of said corner reflector 1006a is determined based on the actual elongation of said corner reflector 1006a, c.f. curve C6 of FIG. 9F, and based on the measured vibration/variation of the distance d, cf. curve C7 of FIG. 9G, e.g. by superposition of the actual elongation C6 of said corner reflector 1006a with said variation C7 of the distance d. FIG. 9H depicts the so obtained effective elongation over time t1, cf. curve C8. This advantageously accounts for the time varying distance d due to said vibrations. As the vibrations may influence a delay experienced by the reflected portion TSR prior to arriving at the detector 122, they may be combined with the elongation of said corner reflector 1006a to enable an efficient processing.

According to further embodiments, if different time bases are used for curves C6, C7, at least one of said curves C6, C7 may be adapted to the other curve, e.g. by interpolation or decimation.

According to further embodiments, the effective elongation C8 of the corner reflector 1006a may represent and/or may be used as said abovementioned delay parameter, which characterizes an effective delay of said delayed signal s2' (FIG. 10) over time t1 taking into account the predetermined time-variable, preferably periodical, delay provided by said optical delay stage 1006 as well as variations C7 (FIG. 9G) of said distance d between said apparatus 100, 100a, 100b and said body 10. Note that according to further embodiments, especially said variations C7 (FIG. 9G) of said distance d between said apparatus 100 and said body 10 may also be non-periodic or may comprise another (arbitrary) shape, depending e.g. on external influences that may cause said vibrations.

Figure 9I:
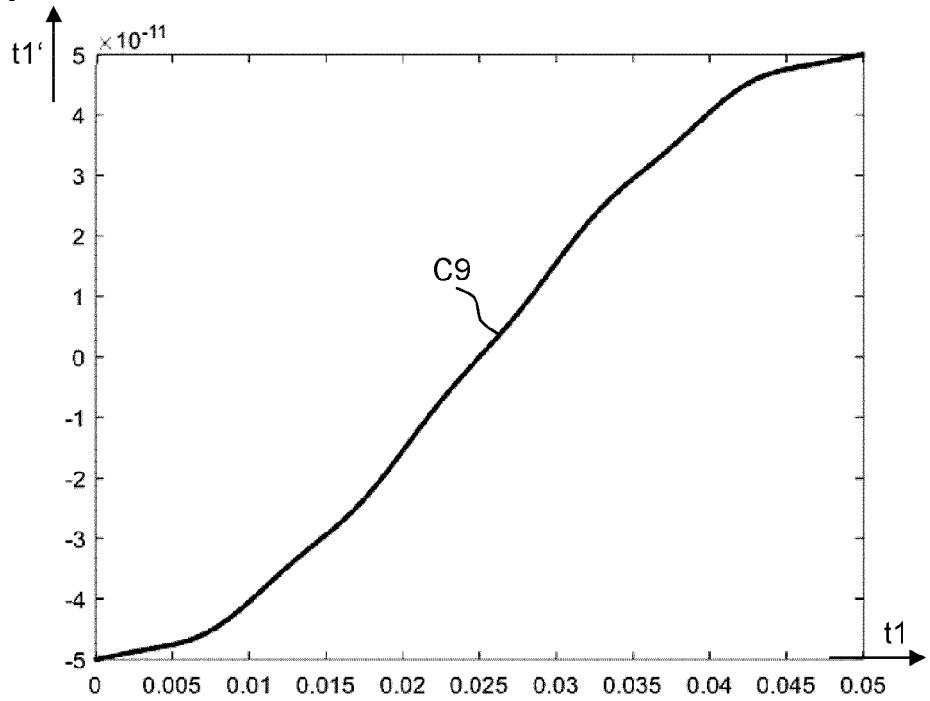

According to further embodiments, a THz time base t1', cf. curve C9 of FIG. 9I, may be determined based on curve C8 of FIG. 9H, similar to FIG. 9C. In other words, curve C9 maps the real time axis t1, for which said sampled signal C5 (FIG. 9E) has been obtained, to the further time axis t1' associated with the received reflected THz pulse TSR.

Figure 9J:
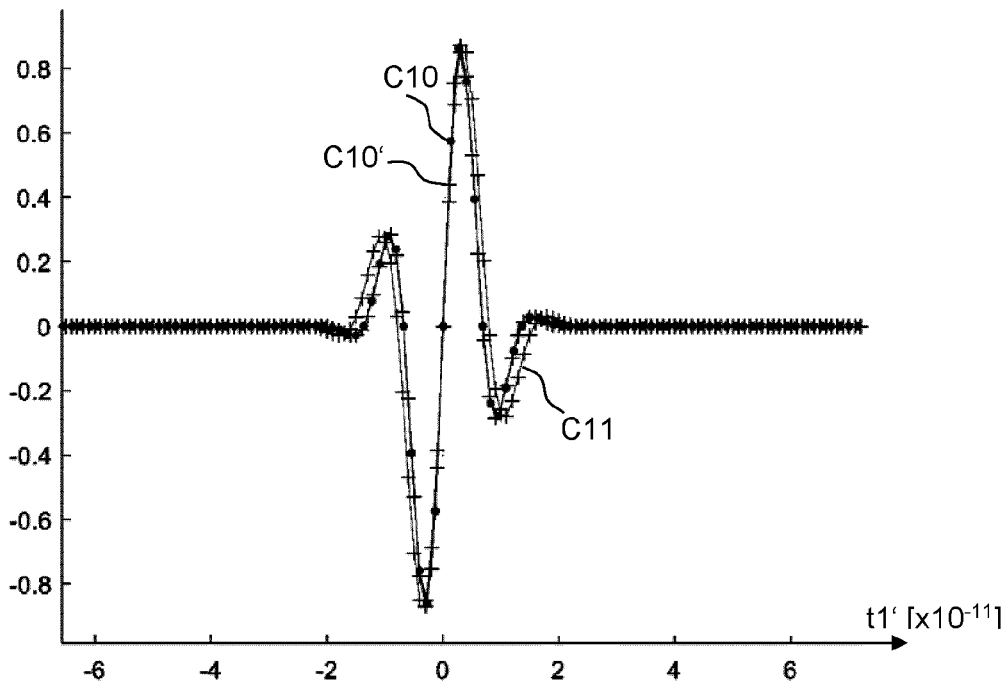

According to further embodiments, said THz time base t1', cf. curve C9 of FIG. 9I, may be used to map the sampled signal C5 to the THz time base t1', cf. curve C10 of FIG. 9J, which represents the electric field [in arbitrary unit] of said received reflected THz pulse TSR over the THz time base t1'. According to further embodiments, an equidistant interpolation of curve C10 may be applied, which yields curve C10'. As the abovementioned undesired variations of distance due to e.g. vibrations are taken into consideration for determining said signal C10, according to further embodiments, it may be considered as a "vibration-compensated" signal, which enables to perform particularly precise THz-signal based layer thickness measurements.

For comparison, FIG. 9J also depicts a further curve C11, which represents the sampled signal over time (THz time base t1') without taking into consideration the vibrations. Curve C11 comprises a significantly different shape, due to the undesired vibrations, wherein a corresponding error may be expected when determining the layer thicknesses based on curve C11, instead of determining the layer thicknesses based on curve C10, C10' according to further embodiments.

The embodiments explained above with reference to FIG. 9E to FIG. 9J exemplarily illustrate that—according to further embodiments—precise layer thickness measurements or determinations of said layer thickness(es) can be made, even if undesired vibrations are present.

According to further embodiments, said apparatus 100, 100a, 100b is configured to determine said delay parameter, cf. e.g. curve C8 of FIG. 9H, which characterizes an effective delay of said delayed signal s2' (FIG. 10) taking into account the predetermined time-variable, preferably periodical, delay provided by said optical delay stage 1006 as well as (undesired) variations of said distance d between said apparatus 100, 100a, 100b and said body 10, e.g. due to vibrations, wherein preferably said apparatus is configured to determine 210 (FIG. 4A) said layer thickness t1, t2, t3 depending on said delay parameter C8. This way, a compensation—if not elimination—of an undesired effect of vibrations (e.g., variations in distance d particularly during THz measurements) may be attained.

According to further embodiments, the apparatus according to the embodiments may advantageously be used with robots 104 (FIG. 8) and/or other positioning systems, e.g. in an in-line configuration of a manufacturing plant, wherein undesired vibrations e.g. caused by said positioning system 104 may be at least partly compensated according to further embodiments. This way, particularly precise layer thickness measurements may be made.

According to further embodiments, any configuration (or combinations) of the distance measuring device 130 according to the embodiments (e.g. according to FIG. 1, 3, 5A, 5B, 6, 7) may be used to determine the variation C7 over time t1 of the distance d.

According to further embodiments, the distance measuring device 130 may be configured to determine said distance d with a predetermined measurement rate of e.g. 1 kHz, preferably 10 kHz or 20 kHz. According to further embodiments, the distance measuring device 130 and/or the control device 103 may determine a variation C7 (FIG. 9G) over time t1 of the distance d, e.g. based on the measured distance d.

Figure 4C:
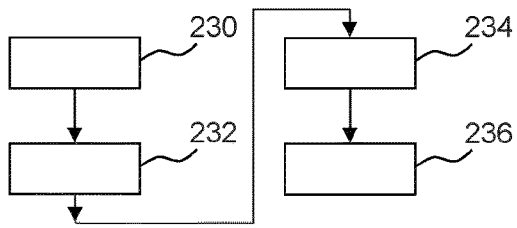
FIG. 4C schematically depicts a simplified flow-chart of a method according to further embodiments.

FIG. 4C schematically depicts a simplified flow-chart of a method according to further embodiments. In step 230, the apparatus 100 generates a THz signal TS and determines the distance d in a predetermined first time window. Preferably said determination of said distance d comprises performing a plurality of distance measurements during said first time window, e.g. at a measurement rate of 20 kHz. In step 232, the apparatus 100 receives a reflected portion TSR of the THz signal TS. In step 234, the apparatus 100 determines the shaker elongation (curve C6 of FIG. 9F), e.g. in a predetermined time interval ranging from t1=0 to t1=0.05. Preferably, said first time window may be identical with said predetermined time interval.

Further, in step 234, also the effective elongation C8 (FIG. 9H) of said corner reflector 1006a (FIG. 10) may be determined based on the actual elongation of said corner reflector 1006a (curve C6 of FIG. 9F, as also determined in step 234), and on a variation of the distance d, cf. curve C7 of FIG. 9G, wherein said variation of the distance d may e.g. be determined based on said plurality of distance measurements during said first time window, as performed in step 230. As an example, said effective elongation C8 (FIG. 9H) of said corner reflector 1006a may e.g. be obtained by a superposition of the actual elongation C6 of said corner reflector 1006a with said variation C7 of the distance d.

In step 236 (FIG. 4C), the thickness of one or more of said layers 11, 12, 13 (FIG. 2) may be determined based on said effective elongation C8 as determined in step 234 of FIG. 4C and based on said received reflected portion TSR of the THz signal TS as obtained in step 232.

According to further embodiments, at least some of the steps 230, 232, 234, 236 or sub-steps thereof may also be performed at least partially overlapping or simultaneously. As an example, the determination of said distance d and the determination of said shaker elongation may be performed simultaneously or quasi-simultaneously.

Figure 11:
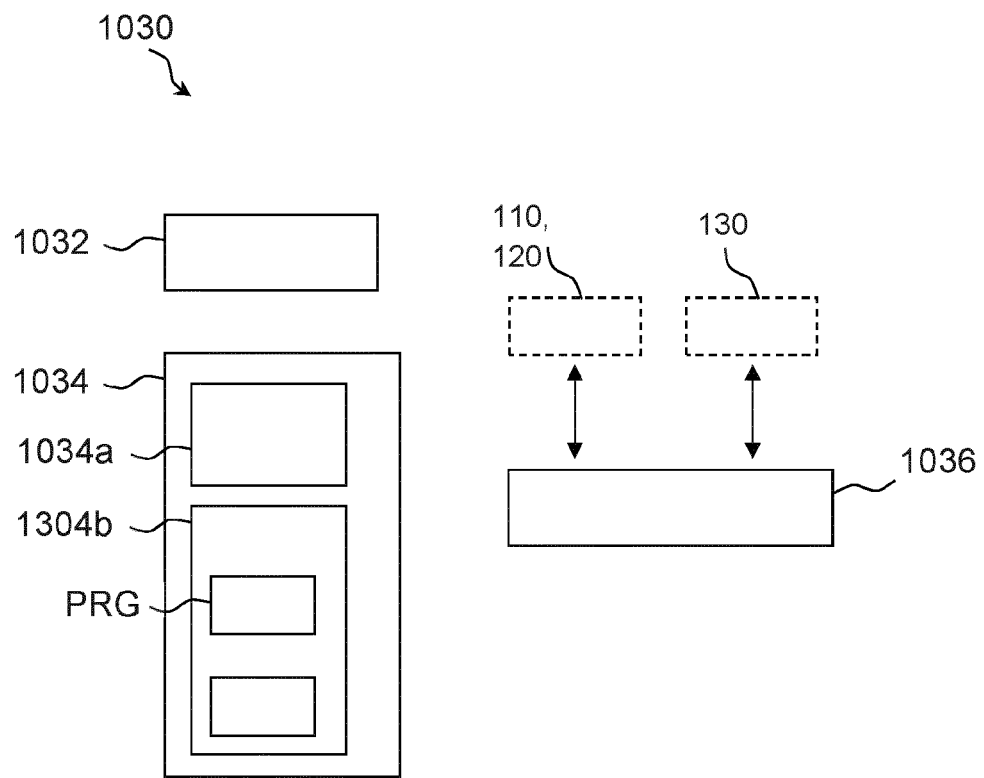
FIG. 11 schematically depicts a simplified block diagram of a control device according to further embodiments.

FIG. 11 schematically depicts a simplified block diagram of a control device 1030 according to further embodiments. According to further embodiments, the optional control device 103 of FIG. 1 may comprise a configuration identical or at least similar to the control device 1030 of FIG. 11.

According to further embodiments, the control device 1030 comprises at least one calculating unit 1032, at least one memory unit 1034 associated with (i.e., usably by) the at least one calculating unit 1032 for at least temporarily storing a computer program PRG, wherein said computer program PRG is configured to at least temporarily control an operation of said control device 1030 and/or said apparatus 100 and/or at least one component 104, 110, 120, 130 of said apparatus 100. According to further embodiments, the computer program PRG is configured to perform the method according to the embodiments.

According to further embodiments, the calculating unit 1032 comprises at least one of the following elements: a microprocessor, a microcontroller, a digital signal processor (DSP), a programmable logic element (e.g., FPGA, field programmable gate array), an ASIC (application specific integrated circuit), hardware circuitry. According to further embodiments, any combination of two or more of these elements is also possible.

According to further embodiments, the memory unit 1034 comprises at least one of the following elements: a volatile memory 1034a, particularly a random-access memory (RAM), a non-volatile memory 1034b, particularly a Flash-EEPROM. Preferably, said computer program PRG is stored in said non-volatile memory 1034b.

According to further embodiments, the control device 1030 comprises a first interface 1036 enabling data communication D1 with and/or control of the THz transmitter 110 and/or the THz receiver 120 and/or the distance measuring device 130.

Further embodiments relate to a use of the apparatus according to the embodiments and/or the method according to the embodiments for determining layer thicknesses of a plurality of layers arranged on a surface of a body, wherein preferably said body and/or said surface of said body may be electrically conductive or may comprise a dielectric material, wherein preferably a top layer of said plurality of layers comprises a clear coat, and wherein preferably a second layer, which is adjacent to said top layer, comprises a base coat. As an example, said body may represent a part of a vehicle such as a car, and said plurality of layers may comprise paint layers.

The principle according to preferred embodiments enables to precisely determine the distance d and/or variations of said distance d, so that precise THz-signal based layer thickness measurements may be performed, wherein the determination of said layer thickness may be made taking into consideration said distance d and/or variations of said distance d. Particularly, at least some of the abovementioned preferred embodiments may at least temporarily offer at least one of the following advantages: a) high precision, e.g. down to a sub-μm (micrometer) range, b) angular displacements e.g. between an optical axis of the optical triangulation sensor(s) and the optical axis of the THz measurement head 102, of up to 1° (degree) may be tolerated, c) large operational range with respect to distance measurements (e.g., +/−10 mm), d) suitable for comparatively large values of said distance d to the body 10 (FIG. 1), e) possibility to align the focal point FP of the THz signal TS and an optical axis and/or measuring spot of the optical triangulation sensor(s), f) independence of a structure and/or composition and/or shape of the layers 11, 12, 13 and the body 10, respectively, particularly of a surface layer 13 (matte/glossy surface), g) cost-effective.

According to further embodiments, it is also possible to employ one or more distance measuring devices other than optical triangulation sensors. According to further embodiments, one or more distance measuring devices based on at least one of the following measurement principle may also be used, alternatively or additionally to the optical triangulation sensors: electric distance measuring devices, acoustic distance measuring devices, optical distance measuring devices other than optical triangulation sensors.

The invention claimed is:

1. An apparatus for determining a layer thickness of a plurality of layers arranged on a body, wherein said apparatus comprises:
   a Terahertz (THz) transmitter configured to emit a THz signal to said plurality of layers;
   a THz receiver configured to receive a reflected portion of said THz signal that has been reflected by at least one layer of said plurality of layers, wherein said apparatus is configured to determine a layer thickness of at least one of said plurality of layers based on said reflected portion of said THz signal;
   a distance measuring device for determining at least one parameter characterizing a distance between said apparatus and said body, wherein said distance measuring device comprises:
   at least one optical triangulation sensor, wherein said at least one optical triangulation sensor is configured and arranged relative to an optical axis of said apparatus such that said at least one optical triangulation sensor is configured to detect: a) a diffuse reflection of optical measurement radiation emitted by at least one light source of said at least one optical triangulation sensor and reflected by a surface region of said body, whereby a first triangulation path is defined; and b) a direct reflection of optical measurement radiation emitted by at least one light source of said at least one optical triangulation sensor and reflected by said surface region of said body, whereby a second triangulation path is defined, wherein said apparatus is configured to determine a quality measure of said first triangulation path and said second triangulation path, and to selectively use at least one of: aa) the first triangulation path or bb) the second triangulation path.

2. The apparatus according to claim 1, wherein said distance measuring device comprises two or more optical triangulation sensors.

3. The apparatus according to claim 1, wherein said THz signal comprises at least one frequency component in the range of 0.3 THz to 100 THz.

4. The apparatus according to claim 1, wherein said at least one optical triangulation sensor comprises:
   at least one light source for illuminating said surface region of said body with optical measurement radiation, wherein said optical measurement radiation comprises laser radiation; and
   at least one light detector for receiving a respective reflected portion of said optical measurement radiation which has been reflected by said surface region.

5. The apparatus according to claim 1, wherein said at least one optical triangulation sensor comprises:
   at least one light source for illuminating said surface region of said body with optical measurement radiation, wherein said optical measurement radiation comprises laser radiation; and
   at least two light detectors for receiving a respective reflected portion of said optical measurement radiation which has been reflected by said surface region.

6. The apparatus according to claim 1, wherein said at least one optical triangulation sensor comprises:
   a first light source for illuminating said surface region of said body with a first optical measurement radiation and a second light source for illuminating said surface region of said body with a second optical measurement radiation, wherein said first and/or second optical measurement radiation comprises laser radiation; and
at least one light detector for receiving a reflected portion of said first and/or second optical measurement radiation which has been reflected by said surface region.

7. The apparatus according to claim 1, wherein said at least one optical triangulation sensor is arranged relative to an optical axis of said apparatus such that said at least one optical triangulation sensor is configured to detect: a) at least a diffuse reflection of optical measurement radiation emitted by at least one light source of said at least one optical triangulation sensor and reflected by a surface region of said body; and/or b) at least a direct reflection of optical measurement radiation emitted by at least one light source of said at least one optical triangulation sensor and reflected by said surface region of said body.

8. The apparatus according to claim 1, wherein said apparatus is configured to select one of said first triangulation path and said second triangulation path depending on said quality measure, wherein said quality measure characterizes a variance and/or noise of a plurality of distance measurements associated with a respective one of said first triangulation path and said second triangulation path.

9. The apparatus according to claim 1, wherein said apparatus further comprises a laser source, a beam splitter, and an optical delay stage, wherein said THz transmitter comprises a THz source, wherein said THz receiver comprises a THz detector, wherein said laser source is configured to provide a laser signal to said beam splitter, wherein said beam splitter is configured to: a) split said laser signal into a first signal and a second signal; b) provide said first signal to said THz source of said THz transmitter; c) provide said second signal to said optical delay stage, wherein said optical delay stage is configured to apply a predetermined time-variable delay to said second signal, wherein a delayed signal is obtained and said delayed signal is provided to said THz detector of said THz receiver.

10. The apparatus according to claim 9, wherein said apparatus is configured to determine a delay parameter that characterizes an effective delay of said delayed signal taking into account the predetermined time-variable delay provided by said optical delay stage and variations of said distance (d) between said apparatus and said body, wherein said apparatus is configured to determine said layer thickness depending on said delay parameter.

11. Method of operating an apparatus for determining a layer thickness of a plurality of layers arranged on a body, wherein said apparatus comprises a THz transmitter configured to emit a THz signal to said plurality of layers and a THz receiver configured to receive a reflected portion of said THz signal that has been reflected by at least one layer of said plurality of layers, wherein said apparatus is configured to determine a layer thickness of at least one of said plurality of layers based on said reflected portion of said THz signal, wherein said apparatus further comprises a distance measuring device for determining at least one parameter characterizing a distance between said apparatus and said body, wherein said distance measuring device comprises at least one optical triangulation sensor, wherein said method comprises:
determining said at least one parameter characterizing the distance between said apparatus and said body;
determining said layer thickness of said at least one of said plurality of layers depending on said at least one parameter; and
wherein said at least one optical triangulation sensor is configured and arranged relative to an optical axis of said apparatus such that said at least one optical triangulation sensor detects: a) a diffuse reflection of optical measurement radiation emitted by at least one light source of said at least one optical triangulation sensor and reflected by a surface region of said body, whereby a first triangulation path is defined; and b) a direct reflection of optical measurement radiation emitted by at least one light source of said at least one optical triangulation sensor and reflected by said surface region of said body, whereby a second triangulation path is defined, wherein said method further determines a quality measure of said first triangulation path and said second triangulation path, and comprises selectively using aa) the first triangulation path or bb) the second triangulation path or cc)both the first triangulation path and the second triangulation path.

12. Method according to claim 11, wherein said distance measuring device comprises two or more optical triangulation sensors.

13. Method according to claim 11, wherein said at least one optical triangulation sensor comprises one light source for illuminating a surface region of said body with optical measurement radiation, and at least two light detectors for receiving a respective reflected portion of said optical measurement radiation which has been reflected by said surface region, wherein said method further comprises selecting one or more of said at least two light detectors for performing a distance measurement.

14. Method according to claim 11, wherein said at least one optical triangulation sensor comprises a first light source for illuminating a surface region of said body with a first optical measurement radiation and a second light source for illuminating said surface region of said body with a second optical measurement radiation, wherein said at least one optical triangulation sensor further comprises at least one light detector for receiving a reflected portion of said first and/or second optical measurement radiation which has been reflected by said surface region, wherein said method further comprises selecting one or more of said at least two light sources for performing a distance measurement.

15. Method according to claim 11, wherein said apparatus determines a quality measure of said first triangulation path and said second triangulation path, and selects one of said first triangulation path and said second triangulation path depending on said quality measure.

16. Method according to claim 15, wherein said quality measure characterizes at least one of a variance and a noise of a plurality of distance measurements associated with a respective one of said first triangulation path and said second triangulation path.

17. Method according to claim 11, wherein said apparatus comprises a laser source, a beam splitter, and an optical delay stage, wherein said THz transmitter comprises a THz source, wherein said THz receiver comprises a THz detector, wherein said laser source provides a laser signal to said beam splitter, wherein said beam splitter a) splits said laser signal into a first signal and a second signal, b) provides said first signal to said THz source of said THz transmitter, c) provides said second signal (s2) to said optical delay stage (1006), wherein said optical delay stage (1006) applies a predetermined time-variable delay to said second signal (s2), wherein a delayed signal (s2') is obtained, and provides said delayed signal (s2') to said THz detector of said THz receiver.

18. Method according to claim 17, wherein said apparatus determines a delay parameter, which characterizes an effective delay of said delayed signal (s2') taking into account the predetermined time-variable delay provided by said optical delay stage and variations of said distance (d) between said apparatus and said body, wherein said apparatus determines said layer thickness depending on said delay parameter.

19. A method of for determining a layer thickness of a plurality of layers arranged on a body using an apparatus, wherein said method comprises:

emitting a THz signal to said plurality of layers from said apparatus;

receiving a reflected portion of said THz signal that has been reflected by at least one layer of said plurality of layers at said apparatus;

determining by said apparatus at least one parameter characterizing a distance between said apparatus and said body by:

detecting a) a diffuse reflection of optical measurement radiation emitted by at least one light source of said at least one optical triangulation sensor and reflected by a surface region of said body, whereby a first triangulation path is defined; and b) a direct reflection of optical measurement radiation emitted by at least one light source of said at least one optical triangulation sensor and reflected by said surface region of said body, whereby a second triangulation path is defined, wherein said method further determines a quality measure of said first triangulation path and said second triangulation path, and comprises selectively using at least one of the first triangulation path and the second triangulation path; and determining by said apparatus a layer thickness of at least one of said plurality of layers using said reflected portion of said THz signal and said at least one parameter.

20. The method according to claim 11, wherein determining at least one parameter comprises:

determining at least one parameter characterizing a distance between said apparatus and said body using a distance measuring device that comprises two or more optical triangulation sensors.

21. The method according to claim 11, further comprising:

illuminating said surface region of said body with optical measurement radiation using at least one light source;

detecting said portion of said THz signal that has been reflected by at least one layer of said plurality of layers using at least two light detectors; and selecting one or more of said at least two light detectors for performing a distance measurement.

22. The method according to claim 11, further comprising:

illuminating said surface region of said body with a first optical measurement radiation using a first light source;

illuminating said surface region of said body with a second optical measurement radiation using a second light source;

receiving a reflected portion of said first optical measurement radiation and/or said second optical measurement radiation which has been reflected by said surface region of said body using at least one light detector; and selecting one or more of said first optical measurement radiation or second optical measurement radiation for performing a distance measurement.

* * * * *